United States Patent
Fertig et al.

(10) Patent No.: US 7,606,631 B2
(45) Date of Patent: Oct. 20, 2009

(54) PACKAGING MACHINE

(76) Inventors: Erwin Fertig, Michaelsberg 29, 97845 Neustadt/Main (DE); Thomas Cord, Bronnbacher Strasse 12, 97828 Marktheidenfeld (DE)

(*) Notice: Subject to any disclaimer, the term of this patent is extended or adjusted under 35 U.S.C. 154(b) by 0 days.

(21) Appl. No.: 10/559,644

(22) PCT Filed: Jun. 7, 2004

(86) PCT No.: PCT/DE2004/001152

§ 371 (c)(1), (2), (4) Date: Jan. 5, 2006

(87) PCT Pub. No.: WO2006/000167

PCT Pub. Date: Jan. 5, 2006

(65) Prior Publication Data

US 2006/0173565 A1 Aug. 3, 2006

(51) Int. Cl.
*G06F 19/00* (2006.01)
(52) U.S. Cl. .................. 700/169; 700/19; 700/95; 700/159; 700/170
(58) Field of Classification Search ............. 700/19, 700/95, 159, 169, 170
See application file for complete search history.

(56) References Cited

U.S. PATENT DOCUMENTS

| | | | |
|---|---|---|---|
| 6,415,439 B1 * | 7/2002 | Randell et al. | 725/153 |
| 6,788,980 B1 * | 9/2004 | Johnson | 700/1 |
| 7,089,099 B2 * | 8/2006 | Shostak et al. | 701/32 |
| 7,469,707 B2 * | 12/2008 | Anderson et al. | 137/78.3 |
| 2002/0026533 A1 * | 2/2002 | Dutta et al. | 709/313 |
| 2007/0116104 A1 * | 5/2007 | Fujiwara et al. | 375/149 |

OTHER PUBLICATIONS

"Time Synchronization for Wireless Sensor Networks" -Elson et al, 2001 International Parallel and Distributed Processing Symposium, Apr. 2001.*
"Time Synchronization in Wireless Sensor Networks", Dissertation by Jeremy Elson, Jun. 29, 2003.*

(Continued)

*Primary Examiner*—Michael D Masinick
(74) *Attorney, Agent, or Firm*—Edwin D. Schindler

(57) ABSTRACT

A packaging machine is described, which is equipped with sensors, actuators and drive systems, comprising a servo motor, a central control unit and a system for data transmission. The actual values of the sensors, actuators and drive systems are recorded in digital form in each case and transferred with the use of a transmission protocol via the data transmission system to the central control unit, evaluated by the latter and the determined setpoint values or control commands are also transmitted, in digital form and with the use of the transmission protocol, from the control system via the data transmission system to the actuators or drives According to the invention, it is provided that the data transmission between sensors, actuators, drives and central control unit and vice versa takes place wirelessly and the transmission protocol operates cyclically and with short cycle times, preferably in millisecond pulses. According to the proposal, the transmission protocol serves for synchronization of all sensors, actuators and drives, prepares the actual values and the determined setpoint data of all drives in each cycle, the accuracy of the synchronization and the preparation lying in the microsecond range. The transmission protocol keeps essential information redundant and eliminates errors in the data transmission by means of error correction processes, for example the HDLC process.

21 Claims, 1 Drawing Sheet

OTHER PUBLICATIONS

Figure 1:
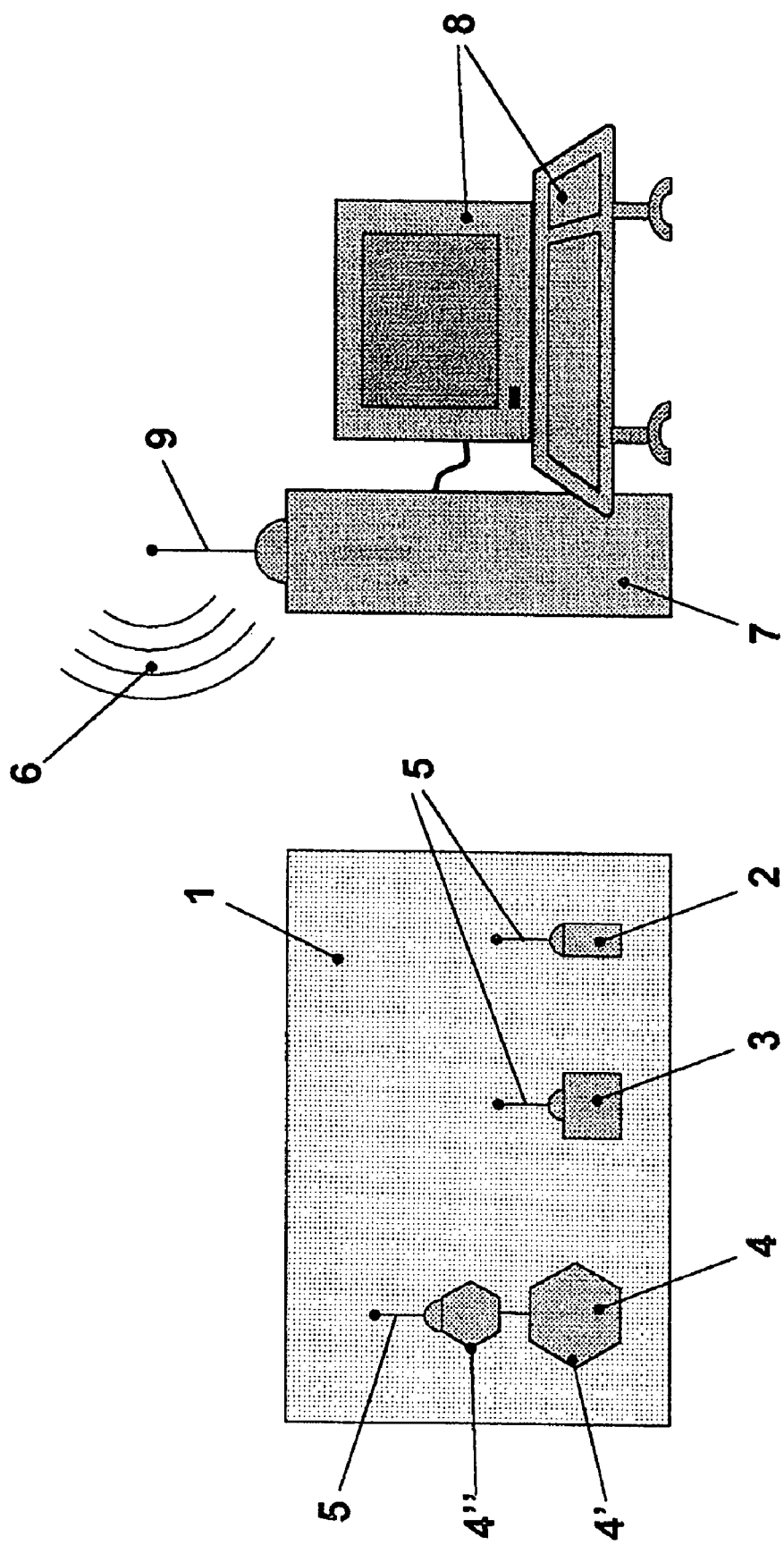

"Wireless Sensor Networks: A New Regime for Time Synchronization" -Elson et al, Hot Topics in Networks, Oct. 2002.*

"The VLT Time Reference System: A Microsecond-Accurate Time/Synchronization Bus for Distrubuted Control Systems" -Marchet et al, International conference on Alccelerator and Large Experimental Physics Control Systems, 1999.*

"Internet Archive Wayback Machine" search results for http://www.circlemud.org/~jelson/ showing indexing history for Jeremy Elson's Homepage.*

"Jeremy Elson's Homepage", http://www.circlemud.org/~jelson/, printed Feb. 23, 2008. Last Updated Oct. 22, 2004.*

"Jeremy Elson's Writings", http://www.circlemud.org/~jelson/writings/— Last Updated May 30, 2003.*

"An analytic study of tuning systems parameters in IEEE 802.11e enhanced distributed channel access", Ge et al, Computer Networks 51 (2007) 1955-1980, ScienceDirect.*

* cited by examiner

PACKAGING MACHINE

BACKGROUND OF THE INVENTION

1. Technical Field of the Invention

The invention relates to a packaging machine equipped with sensors, actuators and drive systems, comprising a servo motor, a central control unit and a system for data transmission, the actual values of the sensors, actuators and drive systems being recorded in digital form in each case and transferred with the use of a transmission protocol via the data transmission system to the central control unit, evaluated by the latter and the determined setpoint values or control commands being also transmitted in digital form and with the use of the transmission protocol from the control system via the data transmission system to the actuators or drives.

2. Description of the Prior Art

In the packaging of foods, a large number of processes are usually necessary, such as feeding the packaging material or container, filling the container, closing the container and labelling the packaged goods. Each of these processes is in turn subdivided into a large number of individual steps, which are executed by different machines or machine components, all the individual steps having to take place synchronously with one another.

Whereas packaging machines with intermeshed mechanical components were formerly used to solve the problem, packaging machines of the current prior art have a large number of "intelligent" sensors, actuators and drives. These elements perform the intended tasks largely "autonomously", the actuation and coordination of these elements taking place by means of a central control unit. In such cases, there is extensive, usually bidirectional, data exchange between the central control unit and aforementioned elements.

The transmission of the data in the case of packaging machines of the prior art takes place by means of wires via a data transmission system. The wiring provides comparatively high security against transmission errors, since modern packaging machines have a very large number of sensors, actuators and drives, however wiring these elements is associated with high consumption of time and materials, the material including not only the cable but also large distributor cabinets and switch cabinets. Furthermore, the large number of cables often leads to a confusion of cables, which proves disadvantageous when looking for faults.

For transmitting the data and information between the control unit and sensors, actuators and drives, and vice versa, communication protocols are necessary, which regulate the data exchange procedure. With the application of data transmission to the field of packaging machines, these protocols must ensure rapid and reliable data transmission. In particular, with the actuation of drives, it is necessary for the protocol to make the actual and setpoint data available without error and within very short times and with a high time accuracy. The throughput of the data transmission system must be all the greater the higher the degree of automation of the packaging machine and consequently the greater the number of elements that are integrated into the data exchange.

SUMMARY OF THE INVENTION

Against this background it is the object of the invention to provide a packaging machine that requires no outlay for wiring and in addition, while simultaneously maintaining data security, permits the number of sensors, actuators and drives, and therefore the degree of automation, to be increased.

According to the invention, this object is achieved in that the data transmission between sensors, actuators, drives and central control unit and vice versa takes place wirelessly, the transmission protocol
  operates cyclically with short cycle times, preferably in millisecond pulses,
  performs synchronisation of al sensors, actuators and drives,
  and carries out the provision of the actual values and the determined setpoint values of all drives in each cycle,
  the accuracy of the synchronisation and the provision lying in the microsecond range
essential information is redundant and errors in the data transmission can be eliminated by means of error correction processes, for example the HDLC process.

The invention starts from packaging machines that are known per se, are equipped with sensors, actuators and drive systems with servo motors, and possess a central control unit and a system for data transmission. In distinction to machines of the prior art, data transmission in the case of the packaging machine according to the present invention takes place via a wireless system.

According to a basic concept of the invention, the wiring that is normally required between the sensors, actuators and drives and the central control unit can be a priori avoided. This advantageously leads to a reduction in the need for wiring, switch cabinets and therefore space, and correspondingly the clarity is increased. These purely external boundary conditions can be used to increase the number of sensors, actuators and drives, and therefore the degree of automation. Furthermore, searching for errors is facilitated, since the confusing wiring is eliminated.

The function of the central control unit is to actuate and monitor as many sensors, actuators and drives as possible. In particularly the drives must be required to make precise movements, with the individual drives running absolutely synchronously with one another. These tasks require extensive and precise data exchange between all the components involved, by which means the setpoint values, such as the position or velocity data for the drives are made available or, vice versa, status and error messages are fed back to the central control unit.

The data acquisition in the present invention takes place, as with packaging machines of the prior art, digitally, the protocol for transmitting data operating, unlike in the prior art, with short cycle times, performing synchronisation of all sensors, actuators, drives and carrying out the provision of the actual values and the determined setpoint values of all drives in each cycle. The accuracy of the synchronisation and the preparation here lies in the microsecond range. These measures make it possible to use drive systems with a very rapid time response (dynamics). In addition, the number of drives used can be increased. The advantageous consequence of this is a higher degree of automation of the packaging machine.

According to a further feature of the invention, essential information is kept redundant by the data transmission protocol and errors in the data transmission are eliminated by means of error correction processes, for example the HDLC process. Error correction allows incorrectly transmitted data to be recognised and measures for interruption-free operation to be activated. Depending on the type of error, these measures may cause, for example, a back analysis to computer the error-free values or ignoring of the incorrect data and repeat of the data transmission. Since in the case of wireless data transmission system, the data to be transmitted are in principle subject to multiple interferences, in the case of transmission in a shielded cable, recommended error correction processes are to be provided. The application of the error corrections then leads to the data security in wireless transmission systems being at the same level as in wire-dependent systems.

As a result, the proposed solution provides a packaging machine that requires no outlay for wiring and in addition, while simultaneously maintaining data security, permits the number of sensors, actuators and drives, and therefore the degree of automation, to be increased.

DETAILED DESCRIPTION OF THE PREFERRED EMBODIMENTS

In the case of packaging machines, the drives are required to have very complex movement sequences, which ensure the greatest possible jerk-free movement of the goods to be packaged, packaging materials and the machine components. These movement functions of the drives can partly be specified by means of appropriate mathematical functions, such as sinusoidal functions or higher-order polynomials. The movement functions of the drives are discretized in time (milliseconds) and transmitted to the drives by the data transmission system. According to a feature of the invention, it is correspondingly provided to control the movement of the drives by means of a position or velocity control, i.e. by specifying position or velocity data and the associated time points, and to equip the control unit or a controller assigned to the drives in each case with an interpolator, which generates the time function of the position or velocity data by interpolation between the setpoint values determined by the central control unit. Interpolation is necessary because the cycle times of the controllers (position, velocity, current) are much lower than the cycle time of the data transmission to the drives.

Here, the following advantageous sequence is provided: On each time point of data transmission, the controller, or the aforementioned interpolator, receives the setpoint value determined from the actual value by the control unit, and, from this and if appropriate from past values, calculates the time function of the position and velocity coordinates using a given algorithm such as interpolation. The time function in its entirety is thus represented by means of discrete points—the set point values that are determined by the control unit—and, in each case, contiguous curve sections, which have been determined by the interpolator and bridge the time period between two data transmissions.

From the point of view of a drive, it is thereby ensured that a clear position is defined for each point in time. Since this statement applies for all the drives of the packaging machine, in interaction with a microsecond-accurate sychronisation of the individual drives and microsecond-accurate provision of the setpoint values, a definite behaviour for the entire system is fixed at each point in time. According to a basic concept of the invention, a deterministic time behaviour thus applies to the entire system. This time behaviour allows a large number of rapid drives to be provided in a packaging machine and actuated, coordinated and monitored by means of the provided control unit.

As regards the selection of the wireless transmission system, two different technologies are available. Corresponding to a feature of the invention, radio, preferably broadband radio, or infrared communication is proposed. Infrared technology offers the advantage of comparatively inexpensive system components and a licence-free operation, but in each case eye contact between the transmitter and receiver is required, which is not available in many applications. It is advantageous with the use of the radio solution in particular to use broadband radio, and therefore transmit a large number of data via one radio channel.

In a further embodiment of the invention, it is provided that the data transmission between the central control unit and the respective sensors, actuators or drives and in the opposite direction takes place in each case unidirectionally or bidirectionally. In the case of sensors and actuators, unidirectional data transmission usually takes place, with drives, on the other hand bidirectional data transmission is necessary to carry out the setpoint/actual value comparison.

For control of actuators and in particular servo drives, special controls have been developed, such as numerical controls (NC/CNC) or programmable logic controllers (PLC). However, the technical development of these controls takes place relatively slowly in comparison to the rapid development in the field of PCs. This has led to the PC finding applications in automation technology because of the extremely high effectiveness it achieves. For building up the central control unit in the case of the present packaging machine, the use of PC hardware is therefore recommended. Besides the high effectiveness, the use of PC hardware also offers the advantage of an optimum price/performance ratio.

With the use of PC hardware as a central control unit, it is advisable to connect a programming unit to the central control unit, but according to a feature of the invention such a programming unit is also provided with a different design of central control unit. The user thereby has the possibility to produce the control software for the sensors, actuators and the drives for himself or to make adaptations, modifications and tests of the existing software. In particular the latter possibility leads to a high flexibility, for example when the packaging task is modified.

The aim of maximum flexibility in carrying out different packaging tasks is also served by an advantageous further development of the invention. In this embodiment, it is provided that the adaptation of the sensors and/or actuators and/or drives to the packaging task takes place by means of parameters that are stored in the control unit or in sensors, actuators and drives. The user is thereby provided with extensive possibilities for conditioning the packaging machine for special tasks. The control via parameters furthermore brings a certain transparency into the movement sequences of the machine, which are usually very complex. In an advantageous embodiment of the invention, it is proposed to specify or change the parameters by means of the transmission protocol.

For reliable operation of the drive system of the packaging machine, careful process monitoring is essential. The aim of monitoring is to ensure as far as possible interruption-free operation. To achieve this object it is appropriate to identify deviations, disturbances and faults in the operating process at an early stage and initiate measures that avoid the disturbances or eliminate the faults. In the present invention it is therefore provided that the sensors and/or actuators and/or drives generate information and transmit it to the control unit, which is useful for diagnostic purposes. The control unit evaluates this information and, in the case of operating states that are not according to plan, generates appropriate control measures by means of extensive rules stored in the system for possible fault functions. Downtimes of the machine are thereby effectively reduced or its availability is increased.

In principle it can be ascertained that, during a single cycle, not all information can be transmitted or must be transmitted, but it is conceivable that, for the transfer of data for slow running processes, the associated information data are transmitted at time intervals, that is to say that the information of the slow process is only transmitted in individual cycle pulses having sufficient time intervals from one another. In practice, it is sufficient for the data of slow information to only be transmitted with every tenth cycle pulse, that is to say that in the pulses lying in between the information of slow processes does not need to be recorded at all. Then, only the information of rapid processes is to be found here. As examples of slow processes, the measurement of the bearing conditions of a drive and/or the temperature of a drive by means of a sensor can be mentioned, which are not subject to rapid changes. Nevertheless, these slow processes are of great importance for ensuring the operating reliability as well as to permit punctual maintenance work As a result, some cycle pulses with less information, namely those of the rapid processes, and some that contain more information are obtained, that is to say those that comprise the rapid and the slow process data.

Deviating from the proposal to exchange information in every cycle pulse or in particular time-spaced cycle pulses, a further suggestion of the invention is only to transmit particular information, in this case very slow information, when there is a need for it. For example, diagnostic information only requires data transmission when a diagnosis operation is carried out because defects have been ascertained. To this end, it is proposed to dimension the time window of a cycle pulse such that it is only capable of incorporating all cyclic information and furthermore the residual time contains a time window, as unused time, which permit additional information to be incorporated as necessary. If a cycle pulse only contains the rapid information, as is represented by the drive information of the servo-motors, parts of the time window thus remain unused. The slow process data, by contrast, are transmitted at particular fixed-time intervals, that is to say the Xth cycle pulse. In comparison, the even slower information, such as diagnostic information is only included arbitrarily in the time window of the individual cycle pulses, that is to say when transmission is necessary. In this manner, the transmission of the data takes place with the least priority.

The appropriate control measures include, in particular, those that permit start-up of the packaging machine, restarting after a fault or else shut down on interruption to operation, power failure, switch off or emergency stop. According to a feature of the invention, it is provided for these cases that, on shut down, the drives brake synchronously with one another, whereas on start up of the packaging machine a synchronous acceleration of the drives takes place.

To facilitate the fault diagnosis it is further proposed, in addition to an on-the-spot diagnosis, to provide a remote diagnosis per modem or internet. From the point of view of the user, this brings the advantage of a considerable reduction in the response times in the event of faults occurring in the machine, from the point of view of the machine manufacturer, of a clear reduction in the servicing and the associated financial burden.

BRIEF DESCRIPTION OF THE DRAWING FIGURES

Further details, features and advantages of the invention can be taken from the following part of the description. In this part, a preferred exemplary embodiment of the present invention is explained in greater detail with reference to a drawing.

The drawing shows in schematic view the essential components of the proposed packaging machine.

DETAILED DESCRIPTION OF THE DRAWING FIGURES

The packaging machine 1 is shown in the left part of the drawing. It contains sensors, actuators and drives, which in the present view are indicated by the symbols 2, 3 and 4, the drive 4 being subdivided into the servo motor 4' and the controller 4". In the present drawing, only one of these elements is shown as representative for the conventionally large number of these elements. Each of these elements is, as the antennas 5 are intended to indicate, connected to a wireless data transmission system which in the present case is realized by a radio system 6.

In the right half of the drawing, the central control unit 7 and the programming unit 8 connected to this unit are shown. The central control unit 7 is, as indicated by the antenna 9, also connected to the wireless data transmission system 6. The object of the central control unit is to actuate and monitor the sensors 2, actuators 3 and drives 4. The data exchange necessary for this takes place exclusively via the wireless data transmission system 6; no data lines are therefore provided between the control unit 7 and packaging machine 1 The exchanged data comprise, inter alia, the setpoint values for the position coordinates of the drives and, vice versa, status and error messages from the sensors 2, the actuators 3 and the drives 4 to the central control unit 7. The data exchange between the control unit 7 and the actuators 3 and drives 4 is designed to be bidirectional, while the data exchange with the sensor 2 is designed to be unidirectional.

The controller 4" contains, inter alia, an interpolator (not illustrated), which calculates the time function of the position coordinates of the drive by interpolation between the setpoint values determined by the central control unit 7. In the process, the respective setpoint value received at the transmission time point is compared with the past setpoint values and determined with the aid of suitable algorithms of the movement sequence. The movement of the drives follows this calculated movement sequence during the time between two data transmissions. The programming unit 8 gives the user the possibility to influence the control and monitor the sequences in the packaging machine. In particular, the user thereby obtains the possibility to produce the control software for the sensors 2, actuators 3 and the drives 4 for himself or to make adaptations, modifications and tests of the existing software.

The invention claimed is:

1. A packaging apparatus, comprising:
   a central control unit;
   a plurality of sensors;
   a plurality of actuators;
   a drive system;
   means for recording in digital format actual values of said plurality of sensors, actual values of said plurality of actuators and actual values of said drive system, wherein data of slow running processes are only recorded in individual time-spaced cycle pulses, so that only the data of fast running processes are contained in cycle pulses contained in between;
   means for determining setpoint values or control commands for said drive system via measurements of said actual values of said drive system taken for a plurality of cycles;
   means for transmission in digital format of said setpoint values of control commands for said drive system between said drive system and said central control unit via a transmission protocol from said central control unit via said means for data transmission to said plurality of actuators or said drive system;
   means for data transmission between said plurality of sensors, said plurality of actuators, said drive system and said central control unit of said actual values of said plurality of sensors, said actual values of said plurality of actuators and said actual values of said drive system recorded by said means for recording in digital format, said means for data transmission including a transmission protocol operating cyclically with short cycle times and performing a synchronization of said plurality of sensors, said plurality of actuators and said drive system with time-dependent action and further providing said actual values and said setpoint values or control commands for said drive system in each cycle and accuracy of said synchronization in a microsecond range;

means for evaluating data received by said central control unit from said plurality of sensors, said plurality of actuators and said drive system;

means for eliminating errors in said means for data transmission and said means for transmission in said digital format; and, a time window assigned to each cycle pulse of said cycle pulses wherein, despite data transmission, comprises a residual time, which is able to be used for transmitting optional information.

2. The packaging apparatus according to claim 1, wherein said drive system includes a servo motor.

3. The packaging apparatus according to claim 1, wherein said short cycle times are in a millisecond pulse.

4. The packaging apparatus according to claim 1, wherein said means for eliminating errors in said means for data transmission and said means for transmission in said digital format includes an HDLC procedure.

5. The packaging apparatus according to claim 1, wherein said drive system is controlled by specifying position or velocity data at associated points in time.

6. The packaging apparatus according to claim 1, wherein said means for data transmission takes place bidirectionally.

7. The packaging apparatus according to claim 1, wherein said means for data transmission takes place unidirectionally.

8. The packaging apparatus according to claim 1, further comprising a programming unit connected to said central control unit.

9. The packaging apparatus according to claim 1, wherein said means for eliminating errors in said means for data transmission includes data redundancy in said transmission protocol.

10. A packaging apparatus, comprising:
a central control unit;
a plurality of sensors;
a plurality of actuators;
a drive system;
means for recording in digital format actual values of said plurality of sensors, actual values of said plurality of actuators and actual values of said drive system;
means for determining setpoint values or control commands for said drive system via measurements of said actual values of said drive system taken for a plurality of cycles;
means for transmission in digital format of said setpoint values of control commands for said drive system between said drive system and said central control unit via a transmission protocol from said central control unit via said means for data transmission to said plurality of actuators or said drive system;
means for data transmission between said plurality of sensors, said plurality of actuators, said drive system and said central control unit of said actual values of said plurality of sensors, said actual values of said plurality of actuators and said actual values of said drive system recorded by said means for recording in digital format, said means for data transmission including a transmission protocol operating cyclically with short cycle times and performing a synchronization of said plurality of sensors, said plurality of actuators and said drive system with time-dependent action and further providing said actual values and said setpoint values or control commands for said drive system in each cycle and accuracy of said synchronization in a microsecond range;

means for evaluating data received by said central control unit from said plurality of sensors, said plurality of actuators and said drive system; and, means for eliminating errors in said means for data transmission and said means for transmission in said digital format includes means for effecting a shutdown of said packaging apparatus in the event of a fault, said means for effecting a shutdown including means for effecting a synchronous braking and, upon start-up of said packaging apparatus, effecting a synchronous acceleration of said drive system.

11. The packaging apparatus according to claim 10, wherein said drive system includes a servo motor.

12. The packaging apparatus according to claim 10, wherein said short cycle times are in a millisecond pulse.

13. The packaging apparatus according to claim 10, wherein said means for eliminating errors in said means for data transmission and said means for transmission in said digital format includes an HDLC procedure.

14. The packaging apparatus according to claim 10, wherein said drive system is controlled by specifying position or velocity data at associated points in time.

15. The packaging apparatus according to claim 10, wherein said means for data transmission takes place bidirectionally.

16. The packaging apparatus according to claim 10, wherein said means for data transmission takes place unidirectionally.

17. The packaging apparatus according to claim 10, further comprising a programming unit connected to said central control unit.

18. The packaging apparatus according to claim 10, wherein data of slow running processes are only recorded in individual time-spaced cycle pulses, so that only the data of fast running processes are contained in cycle pulses contained in between.

19. The packaging apparatus according to claim 10, wherein said means for effecting a shutdown of said packaging apparatus in the event of a fault includes a modem for remote diagnosis of the fault.

20. The packaging apparatus according to claim 10, wherein said means for effecting a shutdown of said packaging apparatus in the event of a fault includes a modem for remote diagnosis of the fault.

21. The packaging apparatus according to claim 10, wherein said means for eliminating errors in said means for data transmission further includes data redundancy in said transmission protocol.

* * * * *